United States Patent

[11] 3,589,745

| [72] | Inventors | Lawrence W. Dougherty<br>1516 W. St. James Place, Arlington Hts.;<br>Terence J. Gallagher, 1708 W. Lincoln<br>Road, Mount Prospect, both of, Ill. 60005 |
|---|---|---|
| [21] | Appl. No. | 714,588 |
| [22] | Filed | Mar. 20, 1968 |
| [45] | Patented | June 29, 1971 |

[54] COLLAPSIBLE VEHICLE
6 Claims, 16 Drawing Figs.

[52] U.S. Cl.................................................. 280/36, 180/27
[51] Int. Cl...................................................... B62b 11/00
[50] Field of Search............................................ 280/36, 43.19; 296/27, 26; 180/27

[56] References Cited
UNITED STATES PATENTS

| 2,736,568 | 2/1956 | Martin............................ | 280/43.19 |
| 3,329,228 | 7/1969 | Harris............................. | 180/27 |
| 3,427,041 | 2/1969 | Nichols ......................... | 280/43.18 |
| 3,361,440 | 1/1968 | Green............................. | 280/43.18 |

Primary Examiner—Kenneth H. Betts
Assistant Examiner—Robert R. Song
Attorney—Dressler, Goldsmith, Clement & Gordon ABSTRACT: A vehicle collapsible to occupy a smaller volume for storage and transportation purpose which has a front and rear frame held together in sliding relationship so that the vehicle can be reduced in length for storage and extended in length for operation. The vehicle has a seat carried by the rear frame which includes a back support member pivotally movable with respect to the rear frame for folding into an out-of-the-way horizontal position. The rear wheels of the vehicle are carried by a suspension means which holds the wheels in alternative vertically extended and vertically retracted positions. Actuating means is provided for selectively moving the rear wheels to their retracted position by pivoting the back support member to its horizontal position, and for moving the rear wheels to their extended position by pivoting the back support member to its generally upright position. A steering bar is provided, which, when folded, also serves the purpose of retaining all folding parts of the vehicle in their folded positions.

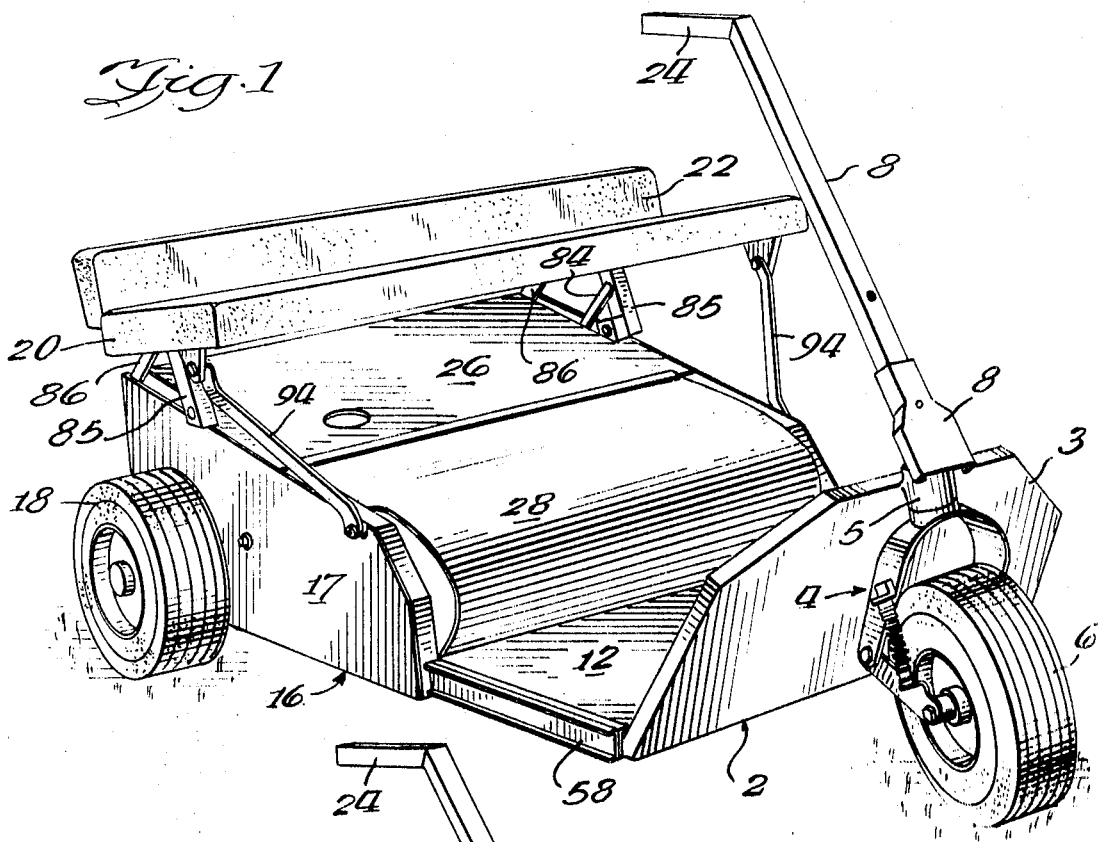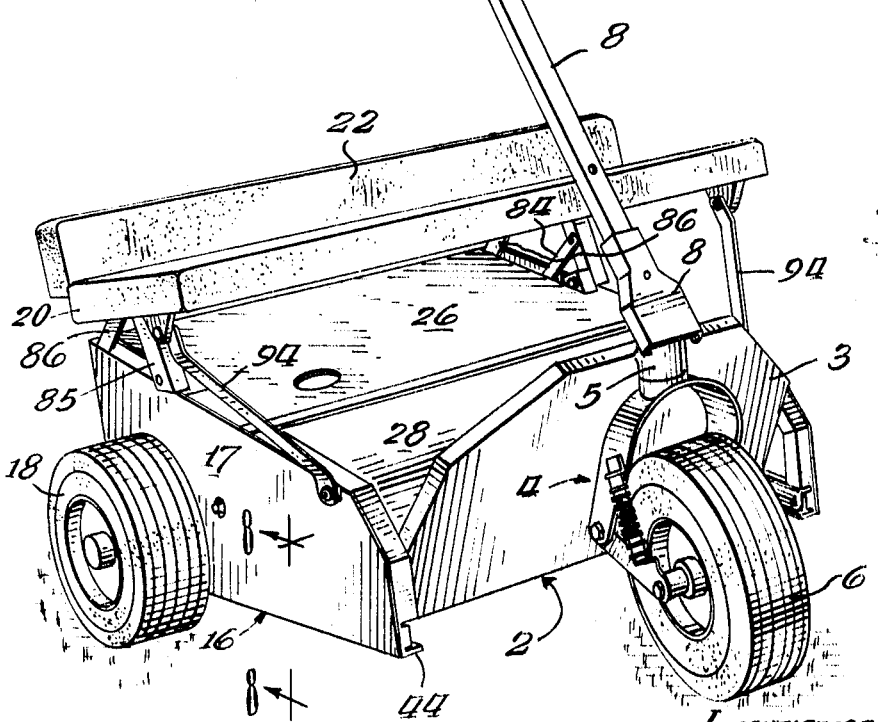

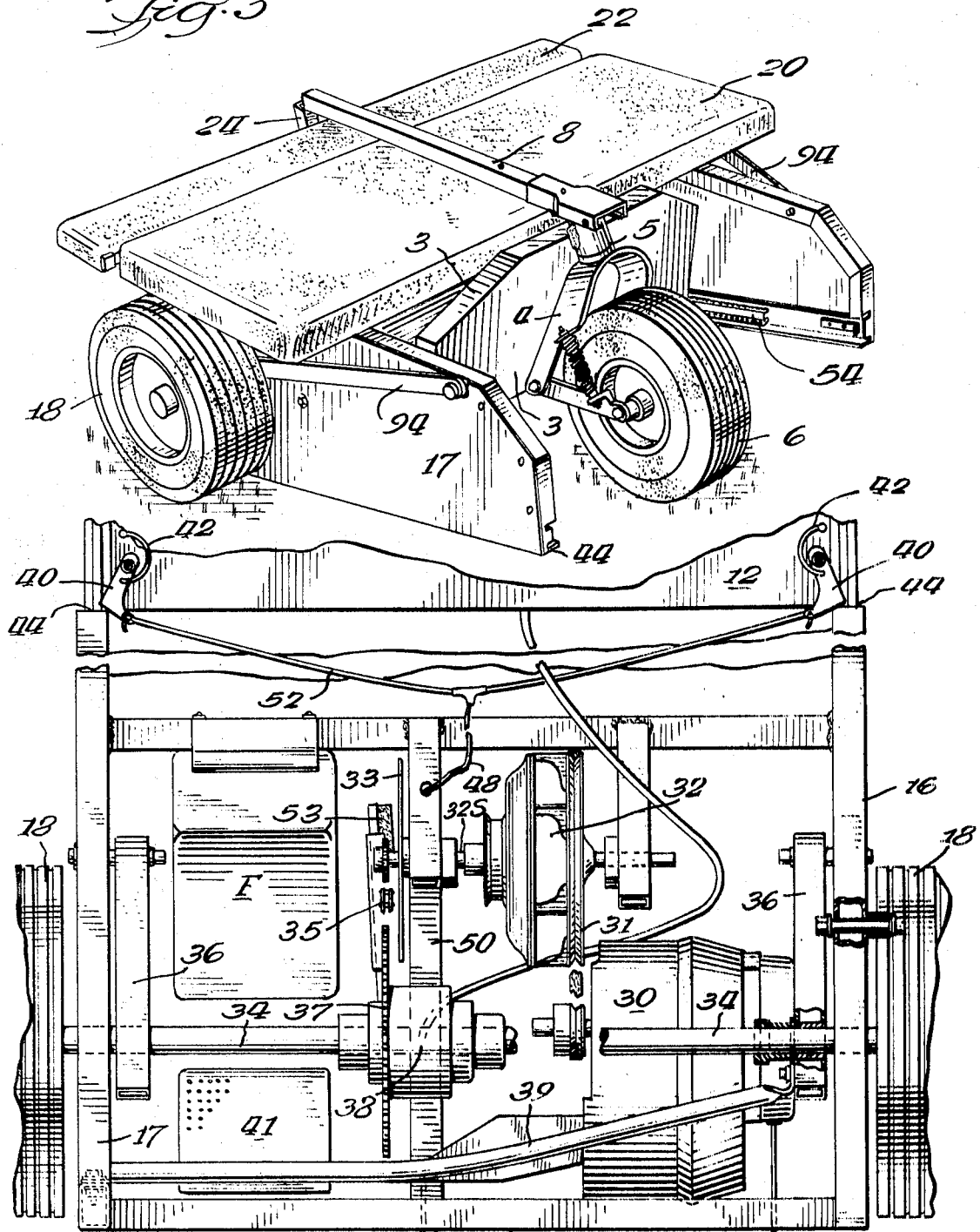

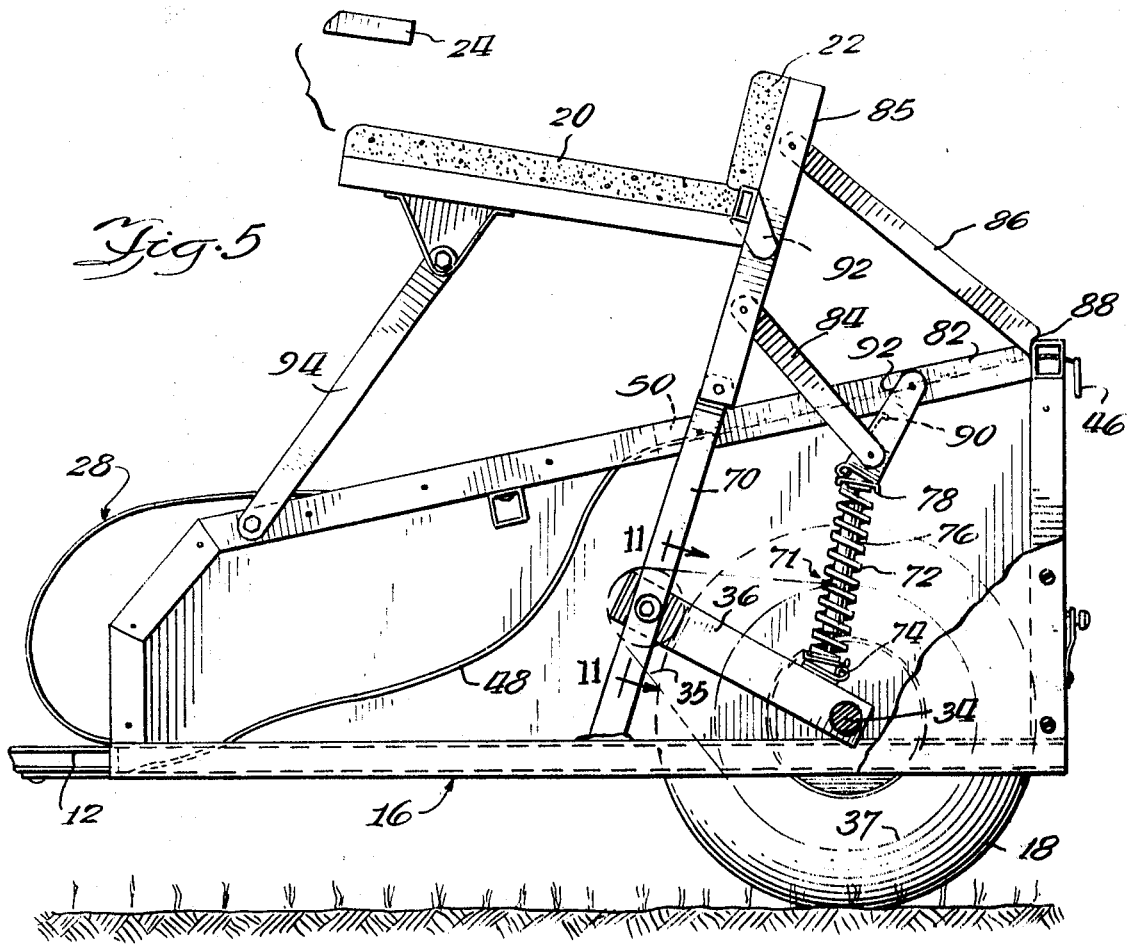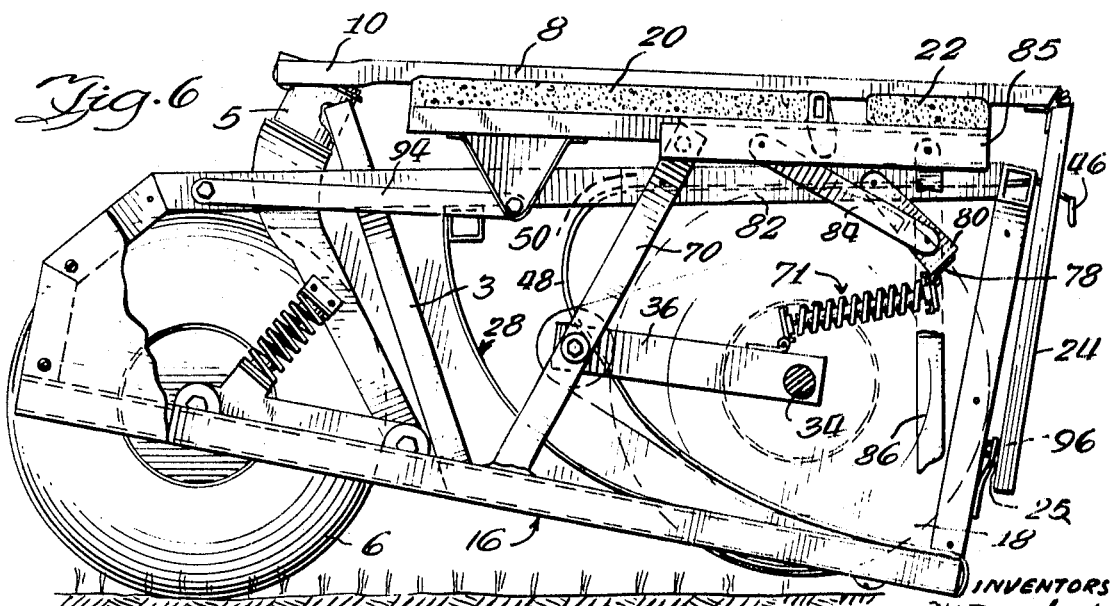

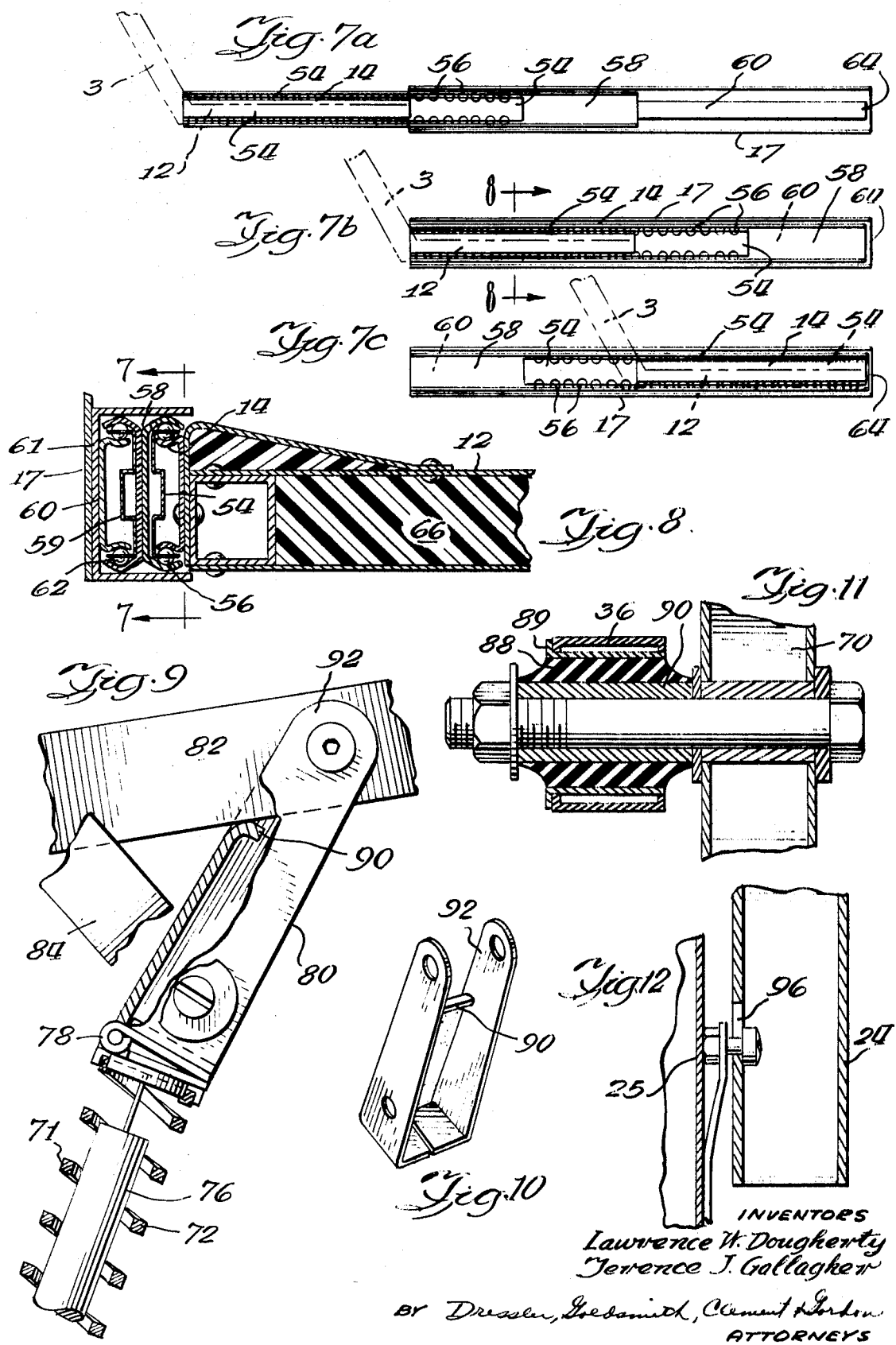

INVENTORS
Lawrence W. Dougherty
Terence J. Gallagher
BY Dressler, Goldsmith, Clement & Gordon
ATTORNEYS

COLLAPSIBLE VEHICLE

BACKGROUND OF THE INVENTION

Small vehicles with engines of very low horsepower are often used as golf carts, as well as for general yard work around the home and for providing transportation around large buildings, parks and airports. It is desirable for the owners of these vehicles to be able to collapse them into a small volume for storage purposes and for ease of carrying, yet the vehicles must also be readily returned to operative condition, ready to transport the user. It is desirable that such a collapsible vehicle be easily and quickly collapsed for storage or transportation, or opened for use. It is also desirable for a small, collapsible scooter or other vehicle to be able to fit into the trunk of an average car in its collapsed or folded carrying position, so that the user can readily transport the vehicle to and from its desired place of use, as, for example, between one's home and the golf course.

While many types of collapsible vehicles have been proposed, difficulties are encountered in designing a vehicle which can conveniently and quickly fold into a package which fits into the trunk of a standard-sized automobile, yet which, when extended into its operative condition, has a sufficiently long wheelbase to travel safely on rough terrain and sufficient height to provide comfortable seating in and boarding of the vehicle.

The invention of this application represents an economically feasible solution to the above difficulties, providing a solidly built, secure vehicle which collapses into a small package with as little as two operations, both of which are easily performed without the aid of any tools.

SUMMARY OF THE INVENTION

The vehicle of this invention has a frame having at least one front wheel and a pair of rear wheels rotatably attached thereto. The rear wheels having a vertically extended, operative position and a vertically retracted position, as well as actuating means to selectively move the rear wheels between their extended and their retracted positions.

In a preferred embodiment, the vehicle of this invention has a front frame including a front wheel holding assembly, at least one front wheel rotatably attached to the front wheel holding assembly, and a floorboard carried by the front frame. This embodiment of the vehicle also has a rear frame which is typically separated by at least one intermediate member between, and in sliding relationship with, both the front and rear frames, so that the front and rear frames can telescope toward each other and move away from each other alternatively into a retracted, storage position or into an extended, operative position. Use of at least one intermediate member between the front and rear frames permits the length of the collapsed vehicle to be equal to or less than half of the extended length.

Ordinarily the vehicle of this invention carries a seat, having a pivotally attached back support member which is generally upright in position during the operation of the vehicle, but which can be folded flat into an out-of-the-way position when the vehicle is to be stored. Preferably, the back support member is pivotally attached to a link which causes the rear wheels to retract as the back support member is pivoted to its flat position, and which causes the rear wheels to extend as the back support member is pivoted to its generally upright position.

Thus, the preferred vehicle of this invention can be conveniently collapsed by merely folding its back support member flat and by sliding the front and rear frames toward each other to provide a package having significantly less height, because of the retraction of the rear wheels, and significantly less length, due to the sliding of the front and rear frames toward each other, than the vehicle in its operative configuration.

It is also desirable for the steering bar of the preferred vehicle of this invention to fold downwardly to engage a latch on the rear frame for the multiple purpose of securing the front and rear frames in the collapsed position and the seat and seat back in the flat position.

The vehicle of this invention typically utilized a novel suspension system which permits its rear wheels to alternatively assume an extended or retracted position and to move therebetween. Furthermore, the novel suspension system of this invention does more than merely permit the wheels to assume a collapsed position as the force of gravity acts on the vehicle frame; it retracts the wheels by positive inward-drawing action, retaining them in the retracted position when the vehicle is lifted off the ground. This greatly simplifies the moving and lifting of the vehicle while it is in a folded position, since the rear wheels remain in their retracted position, and do not flop back and forth between their extended and their retracted positions while the vehicle is being lifted.

Any such flopping about that might result when the vehicle frame is lifted up (as for example when the rear of the vehicle is raised off the ground) is also avoided by the novel suspension system of this invention. This suspension system does not simply permit the wheels to take a selected extended position, but actually retains them in such a position by a positive holding action, even when the vehicle frame is lifted up and lowered again. This of course greatly simplifies any lifting of the vehicle over an obstacle on the ground when the vehicle is in use.

Still another advantage of the vehicle of this invention is that the positive control of the position of the rear wheels with respect to the frame of the vehicle permits use of a method of lifting the vehicle into an automobile trunk and collapsing it there that requires less strength on the part of the user than with other collapsible vehicles. In this method, the user may lift the front of the vehicle into the automobile trunk, while leaving the rear of the vehicle resting on the ground. The user can then slide the front portion of the vehicle deep into the car trunk to leave only the rear wheels outside the trunk. Finally, the rear wheels can be retracted and the position of the collapsed vehicle adjusted in the trunk. Using this method, the user avoids having to lift the entire vehicle off the ground at one time.

In a preferred embodiment, the suspension system of this vehicle has the added advantage of having a shock absorbing spring which permits the rear wheels in the extended position to bounce over bumps without transmitting all of the shock created thereby to the frame of the vehicle. This spring forms part of the means for extending and retracting the rear wheels.

DESCRIPTION OF THE DRAWING

In the drawing:

FIG. 1 is a perspective view of one embodiment of the collapsible vehicle of this invention in its extended, operative condition.

FIG. 2 is a perspective view of the same motor vehicle shown with its front and rear frames in partially collapsed relationship to each other.

FIG. 3 is a perspective view that shows the same vehicle in its completely collapsed condition.

FIG. 4 shows a bottom view of the rear frame and the associated parts of the same vehicle.

FIG. 5 is a side view of the rear portion of the same vehicle in its extended, operative condition, with one wheel and sidewall of the vehicle omitted for clarity.

FIG. 6 is a similar side view of the same vehicle but in its completely collapsed, storage condition.

FIGS. 7a, 7b, and 7c are sectional views taken along line 7–7 of FIG. 8, showing the sliding parts of the same vehicle which permit the front and rear portions of the vehicle to slide together or apart with respect to each other.

FIG. 8 is a fragmentary sectional view taken along lines 8–8 of FIG. 2 and FIG. 7b.

FIG. 9 is a side view, partly broken away, of a portion of the suspension system for the rear wheels of the vehicle shown in FIG. 1.

FIG. 10 is a perspective view of the upper hinge member used in the portion of the rear wheel suspension system shown in FIG. 9.

FIG. 11 is a fragmentary sectional view, taken along the line 11-11 in FIG. 5, showing the attachment of the trailing arm of the rear wheel suspension system to the frame of the vehicle shown in FIG. 1.

FIG. 12 is an enlarged, sectional view of the region around latch 25 shown in FIG. 6.

DESCRIPTION OF SPECIFIC EMBODIMENT

Figure 13:
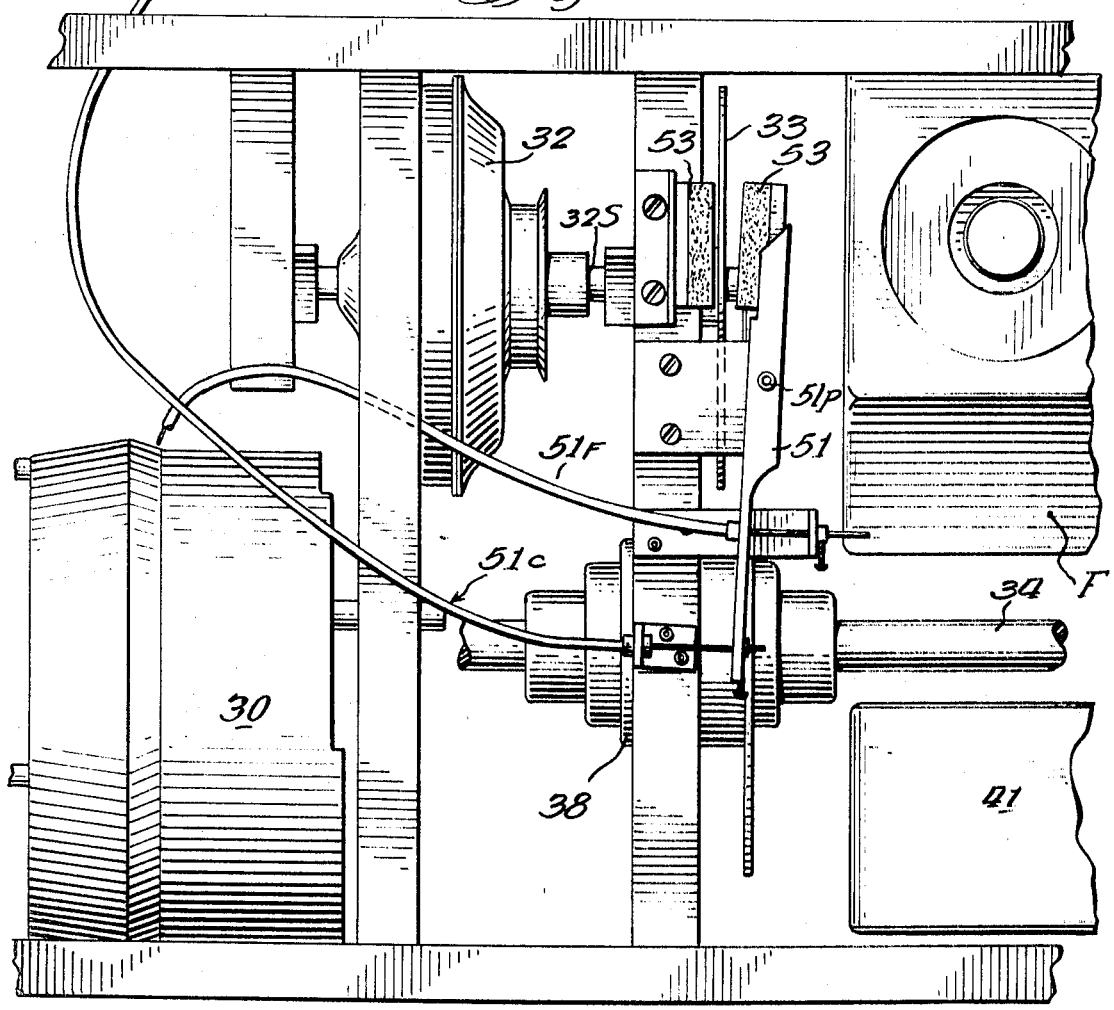
FIG. 13 is a plan view of a portion of the rear frame and associated parts of the same vehicle, with the seat and engine cover, as well as certain other parts, removed.

FIGS. 1 through 3 show a vehicle having a front frame 2 which includes a front panel 3. Front frame 2 carries a front wheel-holding assembly 4 containing a pintle assembly 5, a front wheel 6 rotatably attached to assembly 4, and a steering bar 8. Steering bar 8 is pivotally attached to the pintle assembly 5 to permit the steering bar to turn the front wheel in a desired direction, while also permitting the steering bar to pivot in a vertical plane.

Figure 14:
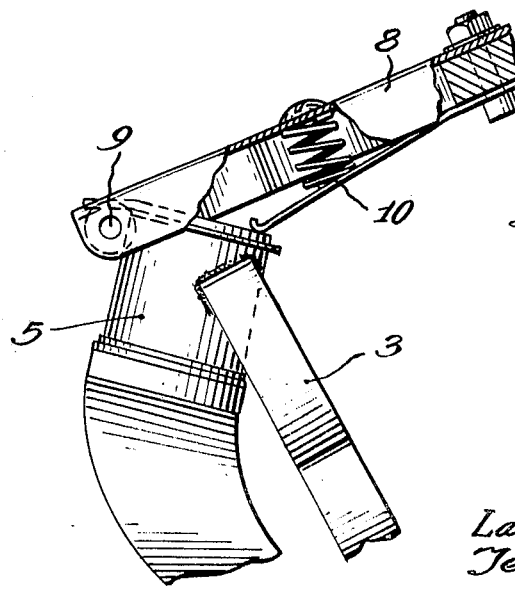
FIG. 14 is a side view, partly broken away, of the hinge mechanism between the steering bar and the wheel-holding assembly of the same vehicle.

A detailed showing of the hinged attachment of steering bar 8 is seen in FIG. 14. Spring means 10 biases the steering bar 8 upward, but permits the steering bar to be forcibly swung downward, rotating about hinge 9 in the process. The steering bar 8 and hinge 9 are attached to pintle assembly 5, which permits the steering bar to turn the front wheel to change the direction in which the vehicle is moving.

The front frame 2 also has a floorboard 12 which carries a track 14 that is in a slidable relationship with the rear frame 16 to permit the front and rear frames to telescope together to shorten the length of the vehicle when it is to be transported or stored, and also to permit the front and rear frames to extend away from each other into operative condition when this is desired, thereby providing a sufficiently long wheelbase to permit the vehicle to provide a reasonable degree of operation safety and comfort.

The rear frame 16 has sidewalls 17, and carries rear wheels 18, a seat 20, and a back support member 22. Both of the latter members can be folded flat into an out-of-the-way position when the vehicle is collapsed into its storage condition. Upon folding the seat and back support member flat, the rear wheels 18 are retracted upwardly (in a manner explained below) to lower the height of the vehicle for easier storage, as is shown in FIG. 3.

When the front and rear frames are collapsed together, the steering bar 8 can be folded downwardly until it rests upon the seat and back support member, and the hinged handle 24 can pivot downwardly to the rear of the vehicle to engage a latch 25 (shown in FIGS. 6 and 12), thus preventing both relative sliding movement between the front frame and the rear frame and upward movement of the seat assembly while the vehicle is being transported.

Rear frame 16 also carries an engine cover 26 and shroud 28. The shroud 28 is typically made of flexible sheet metal which is affixed at one end to rear frame 16 and at the other end to floorboard 12, so that it bows to the rear, following floorboard 12, when the front frame is telescoped toward the rear frame.

FIG. 4 gives a view of the rear portion of the vehicle as seen from the bottom. Gasoline engine 30 is connected by belt 31 to transmission 32. The transmission operates shaft 32s which carries brake disc 33 and drive chain 35. The drive chain operates sprocket wheel 37, which is attached to axle 34 through differential 38, thus transferring power from the engine to rear wheels 18.

The axle 34 is suspended from trailing arms 36, which are part of the suspension system further described below. A stabilizer bar 39, which is secured at one end to one of the trailing arms 36 and at the other to sidewall 17 of the rear frame, prevents lateral motion of the rear wheels and axle.

Fuel tank F and muffler 41 complete the major components of the drive means for the particular vehicle shown, although the specific nature of the drive means does not constitute a part of this invention.

A pair of latches 40 are affixed to the underside of the floorboard 12, and are each biased by a spring 42 against edge 44 of the rear frame 16 so that the front and rear frames are securely held in their extended position with respect to each other during operation of the vehicle.

When it is desired to telescope the front and rear frames together for storing the vehicle, one merely pulls on ring 46 at the rear of the vehicle. Ring 46 is attached to line 48, which runs through hollow member 50 and is attached to crossline 52. Such a pull on ring 46 causes the latches 40 to rotate inwardly out of engagement with shoulder 44, and also causes the front frame to be drawn to the rear a little way to prevent the latches 40 from relatching. After this the front and rear frames are in condition to be slid together into telescoped position.

In the particular embodiment shown, the seat and back support member are collapsed to raise the rear wheels and associated components before the front and rear frames are slid into their completely telescoped position shown in FIG. 3.

FIGS. 7 and 8 show a conventional dual-track ball slide assembly which comprises track 60 affixed to channel 61 which is a part of rear frame 16, ball carriers 54 and 59, balls 62 and 56, intermediate member 58, and track 14 which is affixed to floorboard 12. Intermediate member 58 and carriers 54 and 59 are movable with respect to each other and to tracks 60 and 14.

The three illustrations of FIG. 7 show what happens to the various members as the front frame is telescoped toward the rear frame. Floorboard 12 and front panel 3 are shown in phantom lines.

FIG. 7a shows the position of the various members while the front and rear frames are in their extended, operative position.

FIG. 7b shows typical positions of the various members when the front and rear frames are partially telescoped. As shown, intermediate member 58 and ball carrier 54 have retained their relative positions with respect to each other and to floorboard 12 and the three latter members have all moved to the rear along track 60. As soon as intermediate member 58 reaches the end 64 of track 60 it is stopped, as shown in FIG. 7b. Upon further telescoping, front frame 2, comprising floorboard 12 and front panel 3, proceeds toward the rear and is stopped at the position shown in FIG. 7c.

Balls 62 and ball carrier 59 have been eliminated from FIG. 7 for purposes of clarity.

FIG. 8 also shows additional detail of the construction of floorboard 12. The floorboard is preferably a hollow shell filled with a plastic filling material 66 such as a rigid polyurethane foam.

Referring also to FIGS. 5, 6 and 9, rear wheels 18 are mounted upon axle 34 which passes through a bearing aperture at one end of trailing arm 36.

It should be noted at this point that FIGS. 5 and 6 show only one trailing arm, since the figures show a side view in which the other trailing arm is obscured. Similarly, the other parts of the suspension system shown in these figures are, in this embodiment, duplicated on the other side of the vehicle. FIGS. 1, 2 and 4 show the double arrangement of many of the parts which are shown as single parts in FIGS. 5 and 6.

Trailing arm 36 is hinged at its other end to frame member 70, which is a part of rear frame 16. Lower hinge member 71 comprises spring 72, which is attached to the top side of trailing arm 36 by means of hinge 74, and flexible but nonextensible member 76, which runs axially from one end of spring 72 to the other, and is secured at each end of the spring to prevent the spring from overextending so as to keep the wheels 18 from dropping while they are in their retracted position. Member 76 can be a steel cable surrounded by a sleeve which acts as a stop for the suspension.

The tops of spring 72 and member 76 are affixed to hinge 78 so that the lower hinge member 71 can engage in cooperative hinged motion with upper hinge member 80 which, in turn, is pivoted to upper frame member 82, a part of rear frame 16. Bar 84 is pivotally attached at one end to upper hinge member 80 and at the other end to seat support 85, which is attached to the rear of back support member 22 at locations near the sides of frame member 82. Seat support 85 is hinged to frame member 70 to permit back support member 22 to fold flat when the vehicle is to be collapsed into its storage position.

Strut 86 is pivotally attached to seat support 85 at one end, while the other end of the strut rests against the corner 88 of a crossbar of rear frame 16. A strut 86 is provided on each side of the vehicle, so that the two struts can cooperate to support back support member 22 at each of its ends.

The weight on rear wheels 18 and axle 34 is carried by the arrangement of lower hinge member 71 and upper hinge member 80. When the rear wheels are in their operative position, the upper hinge member 80 bears against frame member 82, so that the weight of rear frame 16 and the parts carried by it is borne by upper hinge member 80.

A more detailed view of upper hinge member 80 is given in FIGS. 9 and 10, showing how the sidewalls 92 of the upper hinge member and lip 90 form a yoke-shaped portion which encloses and pivots about frame member 82. Lip 90 bears against the bottom of the frame member 82 when the upper hinge member is in the load-bearing position shown in FIG. 5, providing a stable suspension system. A sudden shock on the rear wheels 18 when the vehicle is moving is transferred to the axle 34, causing the trailing arm 36 to rotate upward and the force to be damped by spring 72.

Lower hinge member 71 and upper hinge member 80 are capable of engaging in hinged motion with respect to each other. It is preferable for them to be in a "locked knee" position with respect to each other in the manner of a toggle joint, rather than in an end-to-end, parallel relationship, while the rear wheels are in their operative position so that sudden bumps will not throw the two hinge members out of line, causing the rear wheels to retract.

The rear wheels 18 can be retracted, and the seat 20 and back support member 22 folded into a horizontal position, by pulling the back support member 22 and seat supports 85 slightly forward while simultaneously pushing both struts 86 downward to release them from their back-supporting position. The seat 20 and the seat supports 85, which are hinged together at 92, can be folded backwards into a horizontal position by hinged motion on the part of hinged members 94 and seat supports 85, which carry back support member 22 with them into a horizontal position. In so doing, bar 84 is driven downward, causing lower hinge member 71 and upper hinge member 80 to engage in hinged motion to move from their "locked knee" position of FIG. 5 into an acute-angle relationship as shown in FIG. 6. This causes trailing arm 36 to be drawn upward, which in turn causes axle 34, wheels 18, and sprocket 37 (shown in phantom lines) to retract into the frame of the vehicle.

Thus, the one motion of folding seat 20 and back support member 22 into a flat position causes the rear wheels of the vehicle of this invention to retract. Unfolding the seat and back support member once again causes the rear wheels to extend.

As shown in FIG. 6, the collapsed vehicle has the front and rear frames drawn together, the rear wheels retracted, and the seat 20, seat supports 85, and back support member 22 horizontal. The steering bar 8 occupies a horizontal position over the seat and back support member with the hinged handle 24 of the steering bar swung down to a generally vertical position at the rear of the vehicle. Here it engages latch 25 by means of aperture 96 in handle 24, thus preventing the front and rear sections of the vehicle from sliding with respect to each other and the seat members from moving upward. A detailed view of this latch is shown in FIG. 12.

FIG. 11 shows how the trailing arm 36 is attached to frame member 70 by means of a typical rubber bushing assembly, containing rubber bushing 88, which is attached to outer sleeve 89 and inner sleeve 90. Outer sleeve 89 is affixed to the trailing arm 36. Inner sleeve 90 is held to the frame member 70 by a conventional nut-and-bolt arrangement. The position of the trailing arm is adjusted before tightening the nut-and-bolt arrangement so that the rubber bushing 88 is under upward-twisting tension to exert a substantial torque which biases the trailing arm upward toward the upper hinge member, contributing to the retention of the rear wheels in the retracted position.

FIG. 13 shows a top view of many of the major components of the drive system for the vehicle of this invention. Arm 51, which is operated by control cable 51c, is shown in its open position with brake released and engine throttle open. The arm 51 swings about pivot 51p, as operated by cable 51c, which in turn is generally operated by depressing an accelerator foot pedal located in floorboard 12 at the front of the vehicle.

When arm 51 is in its closed position, the engine throttle is closed to its idling position by means of cable 51f, and brake pads 53 are brought to bear against brake disc 33, which is attached to shaft 32s. Thus, releasing the accelerator foot pedal will cause the engine to idle and simultaneously will cause the brakes to be applied to prevent the vehicle from rolling.

From the foregoing, it will be observed that numerous variations and modifications may be effected without departing from the true spirit and scope of the novel concept of the invention.

That which I claim is:

1. A vehicle collapsible to occupy a smaller volume for storage purposes, which comprises: a frame; at least one front wheel rotatably attached to said frame; rear wheels carried by at least one axle which is attached to said frame by means of a retractable wheel suspension system which comprises at least one trailing arm for carrying each of said axles, each of said trailing arms being hinged to said frame at one end of the arm; a lower hinge member pivotally attached at one end to each of said trailing arms; an upper hinge member pivotally attached at one end to each of said lower hinge members and at its other end to said frame to form a hinged joint; and stop means limiting the amplitude of the hinged motion in which said lower and upper hinge members may engage with respect to each other in one direction beyond an end-to-end, parallel relationship, while permitting them to engage in hinged motion freely in the other direction, whereby, as said lower and upper hinge members engage in hinged motion in said other direction to move from said end-to-end, parallel relationship with each other to an acute-angle relationship, the free end of each of said trailing arms is retracted towards said upper hinge members, while during hinged motion in the opposite direction back towards said end-to-end parallel relationship of said hinged members, the free end of each trailing arm is extended away from said upper hinge members; and means for controlling the hinged position of said lower and upper hinge members, whereby said rear wheels have a vertically extended, operative position and a vertically retracted position.

2. A retractible wheel suspension system which comprises: a frame; at least one trailing arm for carrying a wheel axle, each of said trailing arms being hinged to said frame at one end of each arm; a lower hinge member pivotally attached at one end to each of said trailing arms; an upper hinge member pivotally attached to one end to each of said lower hinge members and at its other end to said frame to form a hinged joint; stop means limiting the amplitude of the hinged motion in which said lower and upper hinge members may engage with respect to each other in one direction beyond an end-to-end, parallel relationship while permitting them to engage in hinged motion freely in the other direction, whereby, as said lower and upper hinge members engage in hinged motion in said other direction to move from said end-to-end, parallel relationship with each other to an acute-angle relationship, the free end of each of said trailing arms is retracted toward said upper hinge member, while during hinged motion in the opposite direction back toward said end-to-end, parallel relationship of said hinge members, the free end of each trailing arm is extended away from said upper hinge member; and means for controlling the hinged position of said lower and upper hinge members.

3. The collapsible wheel suspension system of claim 2 in which one of said hinge members comprises a compressible coil spring.

4. The collapsible wheel suspension system of claim 2 in which said lower hinge member comprises a compressible and extensible coil spring having a flexible cable extending axially through said spring and secured to each end of the spring to limit axial extension thereof.

5. The collapsible wheel suspension system of claim 2 in which said means for controlling the hinged position of said lower and upper hinge members comprises actuating means pivotally connected at one end to one of said hinge members and pivotally connected at the other end to an actuating lever, said actuating lever in turn being pivotally connected to said frame, whereby movement of said actuating lever causes said lower and upper hinge members to engage in hinged motion with respect to each other.

6. The collapsible wheel suspension system of claim 2 in which the upper end of said upper hinge member forms a yoke, the arms of said yoke being pivotally attached to said frame, and said stop means is carried by said upper hinge member below said yoke, to permit said hinged motion in one direction no farther than a position slightly beyond the end-to-end, parallel position of said hinge members, but to permit hinged motion of said members freely in the other direction.